United States Patent [19]

Feist et al.

[11] 4,218,273

[45] Aug. 19, 1980

[54] METHOD OF MANUFACTURING STRUCTURAL COMPONENTS

[75] Inventors: Wolf-Dieter Feist, Karlsfeld; Herbert Zech, Neubiberg, both of Fed. Rep. of Germany

[73] Assignee: MTU Motoren-und Turbinen Union Munchen GmbH, Munich, Fed. Rep. of Germany

[21] Appl. No.: 973,256

[22] Filed: Dec. 26, 1978

Related U.S. Application Data

[63] Continuation of Ser. No. 823,375, Aug. 10, 1977, abandoned.

[30] Foreign Application Priority Data

Aug. 13, 1976 [DE] Fed. Rep. of Germany ....... 2636619

[51] Int. Cl.² ............................................. B29C 27/30
[52] U.S. Cl. ..................................... 156/60; 156/242; 308/245; 308/DIG. 14
[58] Field of Search .......................... 156/242, 245, 60; 273/73 F, DIG. 23; 428/902; 308/DIG. 14, 245

[56] References Cited

U.S. PATENT DOCUMENTS

| | | | |
|---|---|---|---|
| 2,924,424 | 2/1960 | Titterington | 308/DIG. 14 |
| 3,417,664 | 12/1968 | Brucker | 308/DIG. 14 |
| 3,741,855 | 6/1973 | Harrison et al. | 273/DIG. 23 |
| 3,902,732 | 9/1975 | Fusha et al. | 273/73 F |
| 3,926,708 | 12/1975 | Long | 156/242 |
| 3,939,024 | 2/1976 | Hoggatt | 156/242 |
| 3,983,900 | 10/1976 | Airhart | 273/DIG. 23 |
| 3,994,319 | 11/1976 | Airhart | 273/DIG. 23 |

FOREIGN PATENT DOCUMENTS

| | | | |
|---|---|---|---|
| 70509 | 10/1975 | Australia | 308/245 |
| 1228573 | 4/1971 | United Kingdom | 428/902 |
| 1335558 | 10/1973 | United Kingdom | 428/902 |

*Primary Examiner*—Caleb Weston
*Attorney, Agent, or Firm*—Alan H. Levine

[57] ABSTRACT

A structural component is made by providing a main body and applying fibre material to the body so as to adjust the coefficient of thermal expansion and/or the modulus of elasticity of the main body. If the main body is made by molding, the fibre material may be embedded in the main body while the molding material is still soft. The fibre material may be loose long fibres adhesively secured to the main body. The fibre material may be a layer having a fibre orientation arranged in the direction in which stress is experienced by the structural component and/or the direction in which expansion of the structural component is to be resisted. Several layers of fibre material may be applied to the main body with the fibre orientation of different layers being in different directions.

5 Claims, 2 Drawing Figures

METHOD OF MANUFACTURING STRUCTURAL COMPONENTS

This application is a continuation of application Ser. No. 823,375, filed Aug. 10, 1977, now abandoned.

This invention relates to a method of manufacturing structural components, such as engine casings, which are required to have a desired coefficient of thermal expansion and modulus of elasticity.

It is generally possible to produce a structural component which has the desired properties by choosing a suitable material for manufacturing the component, but in practice the choice is often restricted by other factors such as the permissible stress or temperature. For example, structural components of precision gearing of engines are subjected to high temperature differences. The gear case is preferably a light metal casting for reasons of weight but other components such as the bearing, for example, must be made of steel. A structure of this kind undergoes differential thermal expansion which causes changes in important dimensions. Another disadvantage is that the metal casing, though suitably light in weight and cheap to manufacture, has poor dimensional stability due to its low modulus of elasticity.

Composite fibre materials are known which have a high modulus of elasticity, achieved by a suitable orientation of the fibres in the material, and also a low coefficient of thermal expansion. Structural components can also be molded from such composite fibre materials. It is known that composite fibre materials which contain long fibres have a high modulus of elasticity in the direction of fibre orientation, as well as low coefficients of thermal expansion. However, components with highly complex contours can only be manufactured from molding materials which are mixed with short fibres, and these materials, as in the case of light metals, have a low modulus of elasticity and high coefficient of expansion due to the matrix material.

It is an object of the present invention to provide an economical method of manufacturing structural components which have the desired modulus of elasticity and the optimum coefficient of thermal expansion for their particular structure and which are capable of withstanding all around, and in particular very high, stresses.

According to the invention, a fibre material, which may take the form of composite fibre sheets or strips or loose fibres, is applied to at least a part of a main body of the component, so as to produce a structural component having a desired coefficient of thermal expansion and modulus of elasticity.

The desired properties may be achieved by suitable selection and orientation of the fibres applied to the body. Suitable high tensile fibre materials are carbon and glass, but carbon fibres are preferred because of their low coefficient of expansion.

The choice of material for the manufacture of structural components subject to severe stress thus acquires degrees of freedom which make it possible to produce very lightweight and economical structures whose properties can be adapted to the given requirements. The sheets of composite material used in this process need not have any particular contours but are simply applied in a suitable size to the structural components which require to be reinforced. It has thereby become possible to use strength composite materials containing long fibres, which when used in combination with the considerably less rigid basic material of the main body, results in a structure having a high and, if desired, directional rigidity. It thus becomes possible to produce apparatus whose high precision is maintained during operation in spite of mechanical and thermal stresses.

If the main body is produced by molding, the long fibres, suitably orientated, may be embedded in the molding material while it is still soft and when it is introduced into the mold. Loose fibres may also be laminated to the surface of the main body by means of a suitable synthetic resin. Sheets or strips of composite fibre material may also be glued or cemented to the main body, and the fibres may be orientated in the direction of the stress to which the body will be subjected or in the direction in which expansion is to be resisted. If the structural part is to be subjected to multidimensional stresses, several layers of composite sheets or strips containing suitably orientated fibres or loose fibres are applied to the main body.

An embodiment of the invention will now be described by way of example with reference to the accompanying drawings in which.

Figure 1:
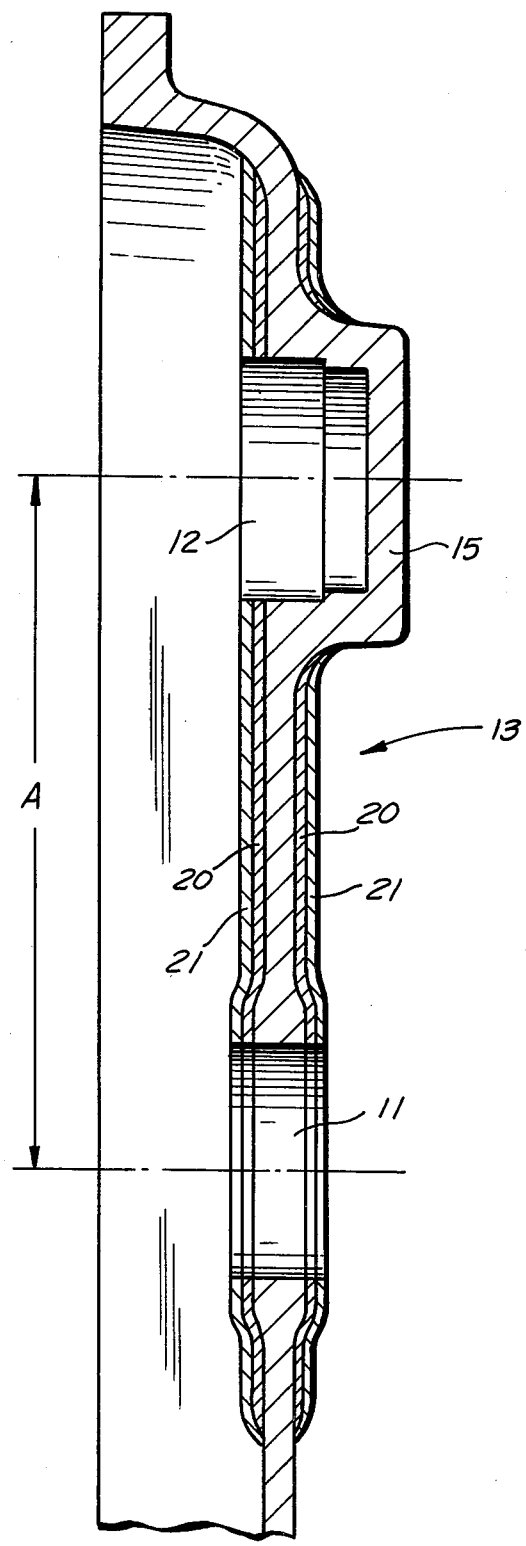
FIG. 1 is a fragmentary cross-sectional view through a casing.
Figure 2:
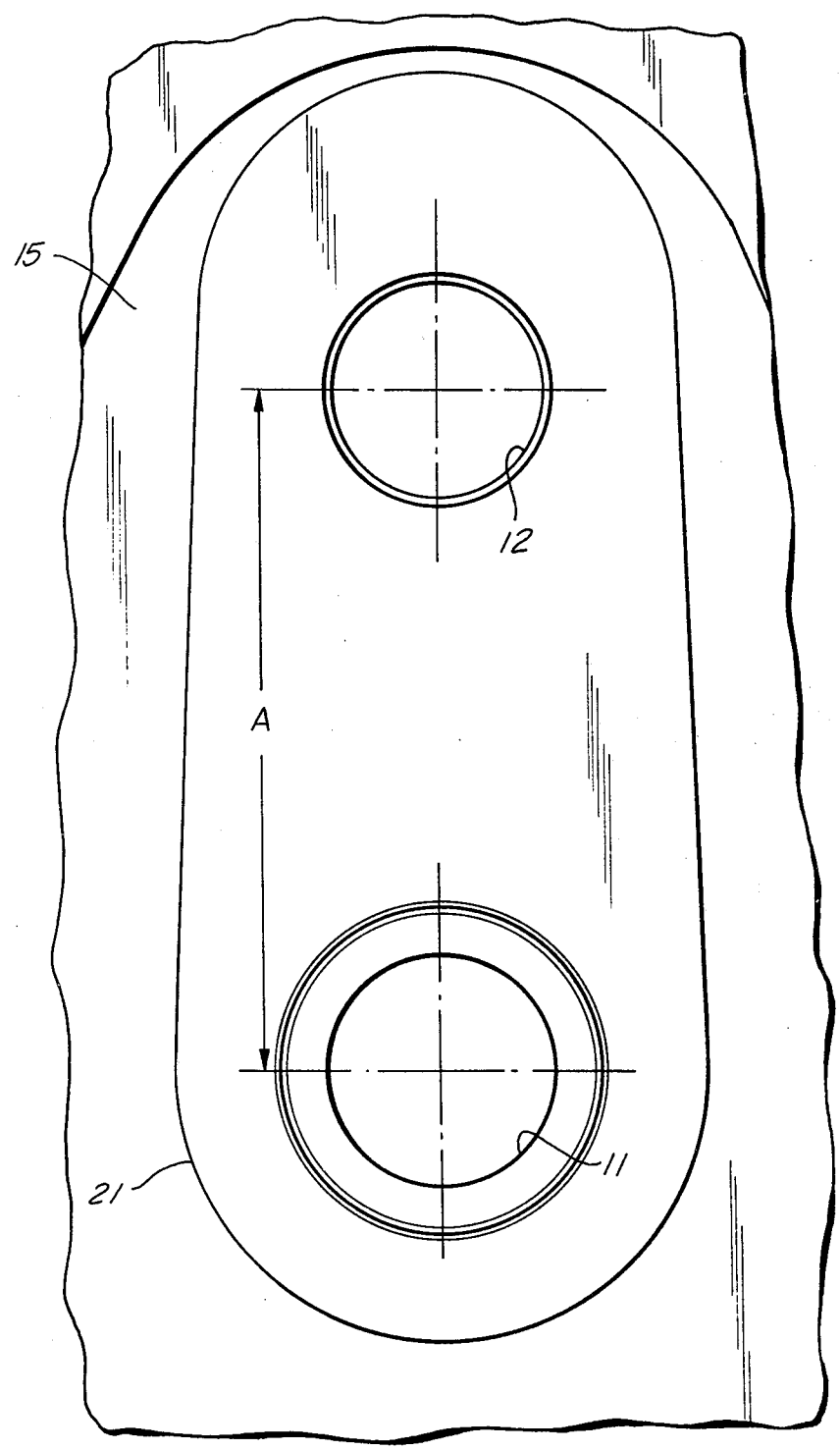
FIG. 2 is a fragmentary face view of the casing looking from the left in FIG. 1.

The drawings illustrate a portion of a casing 13 of precision gearing, which casing can support two bearings at openings 11 and 12. The casing 13 consists of a main body 15 made of a thin light metal, e.g. a magnesium casting, or of glass fibre reinforced plastic, which has the necessary contours for connecting it and fixing it in position. These materials, used on their own, have only a low modulus of elasticity and, compared with the materials conventionally used for gear wheels, a relatively high coefficient of thermal expansion. As a result, when such a casing is used severe warping of the casing is liable to occur, and hence one-sided stress on the gear wheels, and secondly, the distance A would undergo more change on heating than is suitable for gear wheels made of steel.

To prevent this, according to the invention, sheets of composite fibre material 20 and 21 are laminated to the main body 15 in the areas which are subject to stress. The fibres in the individual sheets are arranged to intersect and lie in the direction in which a certain rigidity and/or optimum thermal expansion is required to be obtained. The desired properties can be obtained by the choice of fibres and the direction in which the fibres are applied to the main body.

By constructing casings in this way, their thermal expansion can be adapted to that of the other parts of the gearing, which are generally made of steel. This results in reduced backlash and consequently also a reduction in vibration and noise and in the stress on the bearings and gear teeth.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A method of reducing stress on mechanical parts caused by differences in coefficients of thermal expansion between the parts and their structural support, comprising the steps of providing a structural support having at least two spaced apart support points at which mechanical parts are supported, the materials of the mechanical parts and the structural support having different coefficients of thermal expansion, adhering a plurality of superposed layers of fibre material to the surface of the portion of the structural support containing the support points, each layer having a direction of fibre orientation and the fibre orientation of different layers being in different directions, the number of layers and their direction of fibre orientation being selected to give said portion of the structural support a coefficient of thermal expansion so related to the coefficient of thermal expansion of the mechanical parts that the distance between said support points and the distance between said parts supported at the support points varies at substantially the same rate with temperature variations.

2. A method as defined in claim 1 wherein the structural support is of light metal.

3. A method as defined in claim 1 wherein the structural support is of plastic.

4. A method as defined in claim 1 wherein the mechanical parts are rotatable shafts carrying meshing gears.

5. A method as defined in claim 4 wherein the structural support is the wall of a gearbox.

* * * * *